US011726902B1

(12) United States Patent
Ganesan et al.

(10) Patent No.: US 11,726,902 B1
(45) Date of Patent: Aug. 15, 2023

(54) SYSTEM AND METHOD FOR AUTOMATED BOT TESTING SCENARIO SIMULATIONS

(71) Applicant: NTT DATA Services, LLC, Plano, TX (US)

(72) Inventors: Dhurai Ganesan, Chennai (IN); Sankar Chandrasekaran, Chennai (IN); Gowrishanker Pari, Chennai (IN); Harsh Vinayak, Gurgaon (IN)

(73) Assignee: NTT DATA Services, LLC, Plano, TX (US)

( * ) Notice: Subject to any disclaimer, the term of this patent is extended or adjusted under 35 U.S.C. 154(b) by 55 days.

(21) Appl. No.: 17/371,304

(22) Filed: Jul. 9, 2021

(51) Int. Cl.
*G06F 9/44* (2018.01)
*G06F 11/36* (2006.01)
*G06F 11/07* (2006.01)

(52) U.S. Cl.
CPC ...... *G06F 11/3688* (2013.01); *G06F 11/0772* (2013.01); *G06F 11/3636* (2013.01); *G06F 11/3684* (2013.01); *G06F 11/3692* (2013.01)

(58) Field of Classification Search
CPC .......... G06F 11/3688; G06F 11/3636; G06F 11/3684; G06F 11/3692
See application file for complete search history.

(56) References Cited

U.S. PATENT DOCUMENTS

| 7,913,230 | B2 | 3/2011 | Vikutan | |
|---|---|---|---|---|
| 9,348,617 | B1 | 5/2016 | Cohen et al. | |
| 11,010,287 | B1 * | 5/2021 | Barua | G06N 20/00 |
| 2007/0168743 | A1 * | 7/2007 | Ramamurthy | G06F 11/36 |
| | | | | 714/38.14 |
| 2012/0331353 | A1 | 12/2012 | Pal et al. | |
| 2015/0178182 | A1 * | 6/2015 | Mallya | G06F 11/3664 |
| | | | | 717/124 |
| 2017/0185783 | A1 * | 6/2017 | Brucker | H04L 63/1433 |
| 2017/0228119 | A1 | 8/2017 | Hosbettu et al. | |
| 2017/0372227 | A1 * | 12/2017 | Hosabettu | G06N 5/025 |
| 2019/0066018 | A1 * | 2/2019 | Sethi | G06Q 10/0633 |
| 2019/0129827 | A1 | 5/2019 | Ramasamy et al. | |

\* cited by examiner

*Primary Examiner* — Hang Pan
(74) *Attorney, Agent, or Firm* — Patterson + Sheridan, LLP

(57) ABSTRACT

In an embodiment, a method includes receiving information identifying an input bot for testing. The method also includes detecting a functionality performed by the input bot. The method also includes creating a plurality of inputs for simulation of the functionality of the input bot. The method also includes executing the input bot a plurality of times using a same sample of actions. The method also includes checking for consistency of at least one of behavior and output for the same sample of actions. The method also includes executing the input bot a plurality of times using different samples of actions. The method also includes generating an execution plan for the input bot. The method also includes automatically validating the input bot, where the validation results in an automated determination of whether the input bot is defective.

20 Claims, 5 Drawing Sheets

SYSTEM AND METHOD FOR AUTOMATED BOT TESTING SCENARIO SIMULATIONS

BACKGROUND

Technical Field

The present disclosure relates generally to robotic processes and more particularly, but not by way of limitation, to automated testing for robotic processes.

History of Related Art

Task automation, while often desirable, is not always feasible. Robotic process automation (RPA) platforms have a tendency to provide a framework for automating tasks without providing a streamlined way to learn and adapt. Typically, extensive human intervention is necessary, which limits RPA's scope and volume of use. For example, if an event or exception occurs that a bot is not programmed to handle, typically, the bot must be reprogrammed to explicitly address the event or exception and, thereafter, be redeployed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In an embodiment, one general aspect includes a method of automated testing for robotic processes. The method includes receiving information identifying an input bot for testing. The method also includes detecting a functionality performed by the input bot. The method also includes creating a plurality of inputs for simulation of the functionality of the input bot. The method also includes executing the input bot a plurality of times using a same sample of actions, where at least a portion of the same sample of actions is at least partly based on the plurality of inputs. The method also includes checking for consistency of at least one of behavior and output for the same sample of actions. The method also includes executing the input bot a plurality of times using different samples of actions, where at least a portion of the different samples of actions are at least partly based on the plurality of inputs. The method also includes generating an execution plan for the input bot. The method also includes automatically validating the input bot, where the validation results in an automated determination of whether the input bot is defective. Other embodiments of this aspect include corresponding computer systems, apparatus, and computer programs recorded on one or more computer storage devices, each configured to perform the actions of the methods.

In an embodiment, another general aspect includes a computer system having a processor and memory. The processor and the memory in combination are operable to implement a method. The method includes receiving information identifying an input bot for testing. The method also includes detecting a functionality performed by the input bot. The method also includes creating a plurality of inputs for simulation of the functionality of the input bot. The method also includes executing the input bot a plurality of times using a same sample of actions, where at least a portion of the same sample of actions is at least partly based on the plurality of inputs. The method also includes checking for consistency of at least one of behavior and output for the same sample of actions. The method also includes executing the input bot a plurality of times using different samples of actions, where at least a portion of the different samples of actions are at least partly based on the plurality of inputs. The method also includes generating an execution plan for the input bot. The method also includes automatically validating the input bot, where the validation results in an automated determination of whether the input bot is defective.

In an embodiment, another general aspect includes a computer-program product. The computer-program product includes a non-transitory computer-usable medium having computer-readable program code embodied therein. The computer-readable program code is adapted to be executed to implement a method. The method includes receiving information identifying an input bot for testing. The method also includes detecting a functionality performed by the input bot. The method also includes creating a plurality of inputs for simulation of the functionality of the input bot. The method also includes executing the input bot a plurality of times using a same sample of actions, where at least a portion of the same sample of actions is at least partly based on the plurality of inputs. The method also includes checking for consistency of at least one of behavior and output for the same sample of actions. The method also includes executing the input bot a plurality of times using different samples of actions, where at least a portion of the different samples of actions are at least partly based on the plurality of inputs. The method also includes generating an execution plan for the input bot. The method also includes automatically validating the input bot, where the validation results in an automated determination of whether the input bot is defective.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Figure 1:
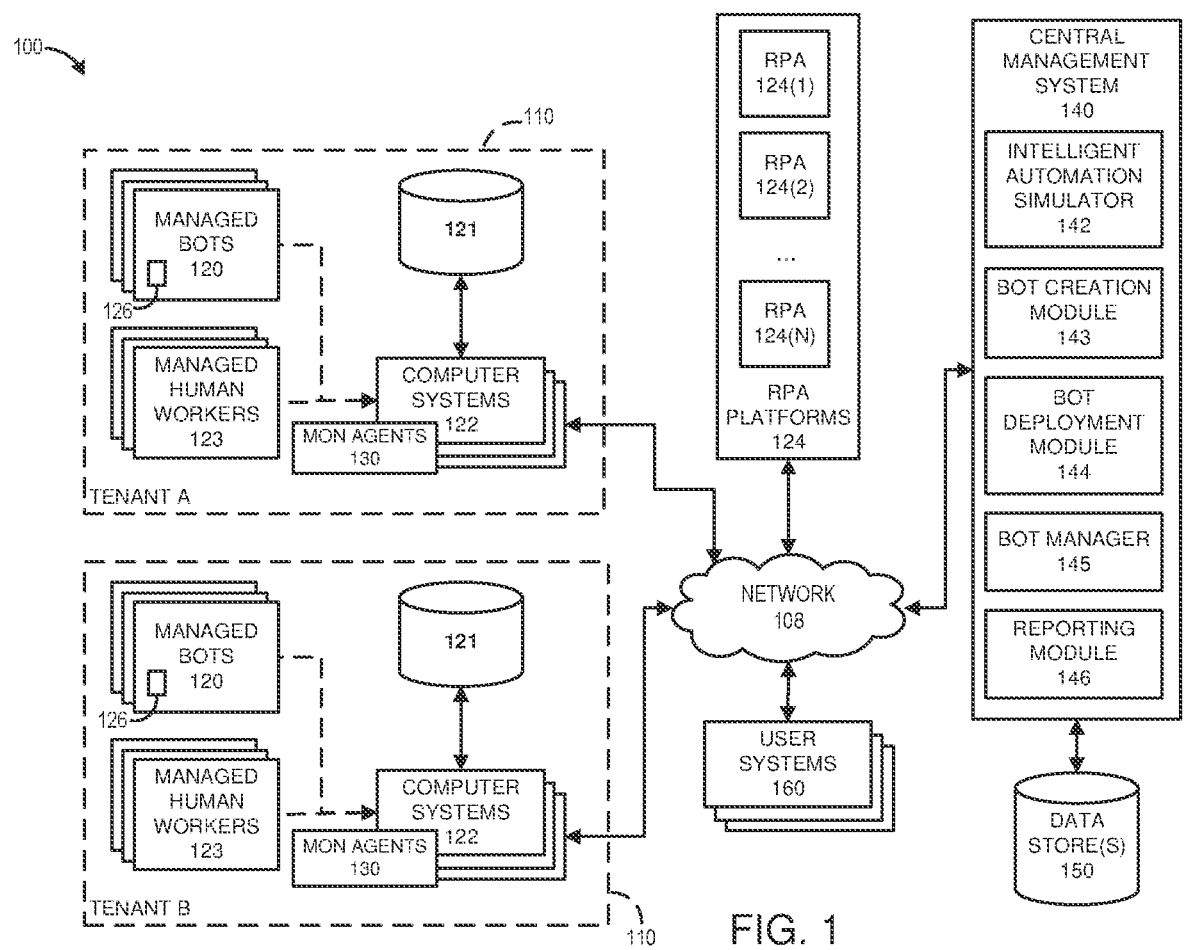
FIG. 1 illustrates an example of a system for implementing a central management system.

Robotic process automation (RPA) is the use of software, typically in combination with artificial intelligence (AI) and machine learning capabilities, to handle high-volume sequences of repeatable tasks that previously required humans to perform. These tasks can include interacting with a user interface (UI), for example, to perform, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof. Oftentimes, the computing environment can further include, for example, many hundreds or thousands of human workers that likewise execute the same or similar computer-implemented tasks, or a combination thereof, via manual interaction with UIs. A set or sequence of computer-implemented tasks, such as the foregoing example tasks, may be referred to as a user-executed process.

Although bots can provide greater efficiency via increased automation, bots introduce numerous technical problems. For example, presently, production-based organizations proliferate the use of automation processes in multiple aspects of business transactions. Handling post-deployment problems, quality issues, and stabilization duration are key challenges for every bot deployment using any robotic process automation (RPA) platform such as AFTE, Blue Prism, UI Path, Automation Anywhere and/or the like. Further, during production, robotic processes encounter multiple problems including unexpected downtime, unknown popup windows, and data anomalies. Traditionally, the aforementioned situations are addressed manually.

The present disclosure describes examples of automatic testing for robotic processes. In various embodiments, an intelligent simulator can be provided for simulating and testing numerous types of scenarios, such as the scenarios descried above. In certain embodiments, the intelligent simulator includes a user-friendly interface and scenario libraries. The scenario libraries can be leveraged to simulate different scenarios for bots. Further, in certain embodiments, information regarding automatic simulation and testing can be provided to a developer, thereby allowing the developer to strengthen a given bot. Additionally, in various embodiments, the intelligent simulator continuously learns new exceptions and new scenarios for testing. Examples will be described below relative to the Figures.

For purposes of this application, the term "UI" can include, without limitation, any type of human-machine interface. Example UIs include text-based interfaces such as command-line interfaces, conversational interfaces, crossing-based interfaces, direct manipulation interfaces, gesture interfaces, graphical UIs (GUIs), hardware interfaces, holographic UIs, intelligent UIs, motion tracking interfaces, natural-language interfaces, object-oriented. UIs, reflexive UIs, touchscreen interfaces, touch UIs, voice UIs, and web-based UIs. Many of the aforementioned UIs accept input via input devices such as a keyboard, mouse, microphone, combinations of the foregoing, and/or the like. Inputs from any of these devices, in possible combination with specific UIs objects or components, can be considered examples of UI events. For illustrative purposes, various examples will be described herein relative to GUIs and UI events that are detected or received in relation to GUIs. It should be appreciated, however, that the principles described herein are applicable to any type of UI, inclusive of the example UIs mentioned previously. A user, unless specifically stated otherwise, or otherwise understood within the context as used, can include any entity, including a human or bot, that can interact with a UI.

FIG. 1 illustrates an example of a system 100 for implementing a central management system 140 for user-executed processes. The system 100 includes the central management system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In some aspects, the central management system 140 can centrally manage bot deployments on the RPA platforms 124 for its tenants. The RPA platforms 124 are shown to include an RPA platform 124(1), an RPA platform 124(2) and an RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats.

In particular, in the system 100, the tenant systems 110 can be served by the central management system 140. In general, the tenant systems 110 can each be considered an abstraction of users, inclusive of both bots and human workers, that execute user-executed processes managed by the central management system 140, and the systems and data sources with which those users interact. For example, one of the tenant systems 110 is shown as being owned or operated by "Tenant A" while another system 110 is shown as being owned or operated by a different tenant, "Tenant B." The tenant systems 110 shown can be owned or operated by the same or different entities. For example, Tenants A and B can represent customers (e.g., entities such as companies or individuals) of an operator of the central management system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more managed human workers 123, one or more computer systems 122 and one or more data sources 121. The one or more computer systems 122 can each provide a computing environment, inclusive of applications and corresponding UIs and dashboards, for executing configurable tasks. As illustrated, any given one of the computer systems 122 may be operated by one of the managed bots 120 or one of the human workers 123. In some cases, the computer systems 122 may represent desktop virtualization environments. In such cases, the human workers 123, for example, may operate the user systems 160 and access the desktop virtualization environments over the network 108.

The one or more data sources 121 of each of the tenant systems 110 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, manually by the human workers 123 and/or robotically by the managed bots 120. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120, for example, as a user-executed process. In some embodiments, the instruction set 126 is in a machine-readable code that can be recognized and executed by a central processing unit. In various embodiments, the instruction set 126 can be made up of, for example, a markup language, a low-level programming language, a high-level programming language, a scripting language, a machine language, an assembly language or any combination thereof.

As illustrated, the computer systems 122 can include monitoring agents 130. The monitoring agents 130 are software agents that can be used to provide information regarding some or all of the managed bots 120. In certain embodiments, the monitoring agent 130 can be individually triggered, for example, by a human user of one of the user systems 160, to monitor and record user activity in the computing environments provided by the computer systems 122. The user activity can represent, for example, user-executed processes in the computing environments. The user activity can include, for example, UI activity.

In the illustrated embodiment, the central management system 140 can include an intelligent automation simulator (IAS) 142, a bot manager 145, a bot deployment module 144, a reporting module 146 and a bot creation module 143. Each of these components can be implemented with hardware and/or software, including (optionally) virtual machines and containers. In an example, the central management system 140 can be implemented as a single management server. In another example, the central management system 140 can be implemented in a plurality of virtual or physical servers, which may or may not be geographically co-located. In some embodiments, the central management system 140 and/or other aspects of the system 100 may be hosted on a cloud-provider system.

In certain embodiments, features of the components of the central management system 140 can be made accessible over an interface to the user systems 160. The user systems 160 can include any type of computing device, including desktops, laptops, tablets, and smartphones, to name a few. The user systems 160 can be operated by users, such as the human workers 123, or by other users, for example, for administration purposes.

The IAS 142 can implement automated bot testing for each of the tenant systems 110. In certain embodiments, the IAS 142 utilizes continuous learning, automatic recommendations, and automatic scoring and decision-making features to significantly reduce development and testing efforts. An example of the IAS 142 will be described in greater detail relative to FIG. 2.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In certain embodiments, the bot creation module 143 can utilize information from the IAS 142 to automatically create each instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

The reporting module 146 can generate regular or on-demand reports related to the managed bots 120 and the managed human workers 123. In various cases, these reports can provide a snapshot of some or all of the managed bots 120 and the managed human workers 123 (e.g., regarding performance gaps as described further below). The reporting module 146 can publish reports or other generated information, for example, to a webpage, user dashboard, and/or the like. The reporting module 146 can generate and execute a query of the one or more data stores 150, as appropriate. The web page, user dashboard or other UI(s) output, for example, by the reporting module 146, can be accessed by certain users of the user systems 160.

In general, the one or more data stores 150 can include any information collected, stored or used by the central management system 140. For example, in various embodiments, the one or more data stores 150 can include instruction sets for bots, command sets for one or more of the RPA platforms 124, deployment settings for bots (e.g., on a tenant-specific and/or bot-specific basis), metadata for bots to be deployed, data collected from the managed bots 120, the human workers 123 or the computer systems 122, combinations of the same and/or the like. In certain embodiments, data stored in the one or more data stores 150 can take the form of repositories, flat files, databases, etc. In certain embodiments, the one or more data stores 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
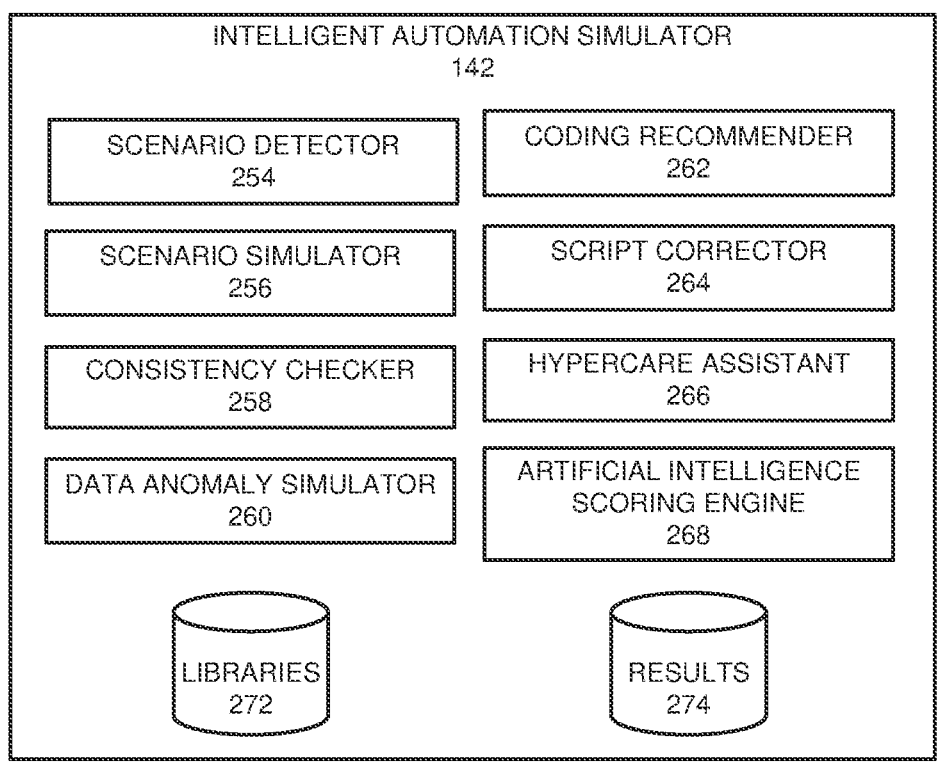
FIG. 2 illustrates an example of an intelligent automation simulator.

FIG. 2 illustrates an example of the IAS 142 of FIG. 1. The IAS 142 includes a scenario detector 254, a scenario simulator 256, a consistency checker 258, a data anomaly simulator 260, a coding recommender 262, a script corrector 264, a hypercare assistant 266, and an AI scoring engine 268. In the illustrated embodiment, the IAS 142 further includes scenario libraries 272 and a results datastore 274.

The scenario detector 254 is operable to receive, for example, information identifying or related to one or input bots for testing or simulation. For example, the scenario detector 254 can receive input scripts according to one or more of the RPA platforms 124 of FIG. 1. The input scripts may be all or part of, or represent all or part of, an instruction set similar to the instruction set 126 of FIG. 1. In a typical embodiment, the scenario detector 254 is operable to detect, or identify, one or more functionalities performed by the input bots. The functionalities can include, but are not limited to, email functionality, spreadsheet functionality (e.g., MICROSOFT EXCEL functionality), web-scraping functionality, enterprise resource planning (ERP) functionality (e.g., SAP functionality), screen-scraping functionality (e.g., CITRIX screen-scraping functionality), combinations of the foregoing and/or the like.

The scenario simulator 256 is operable to create a plurality of inputs for simulation of each functionality of input bots, for example, in order to analyze their efficiency, where the inputs include tasks or actions that the input bots would perform on one or more of the RPA platforms 124. For purposes of creating the plurality of inputs, the scenario simulator 256 can use scenarios in the scenario libraries 272 that are associated with the detected functionalities of the input bots. In some aspects, the scenario simulator 256 serves as, or operates, an optimization engine that generates improvement suggestions for any functionalities and bugs. For example, consider text searching of a spreadsheet. By default, a given input bot may perform a search process by searching text line-by-line. According to this example, the scenario simulator 256 can identify and suggest that the search operation be performed in an optimized manner by instead searching by range of cells. The optimized manner can be identified using rules, artificial intelligence such as machine learning, and/or the like. In this fashion, the scenario simulator 256 can provide suggestions to perform bot functionality with increased efficiency.

The consistency checker 258 repeatedly executes input bots using, for example, the same sample of tasks or actions, such as some or all of the inputs generated by the scenario simulator 256, to check for consistency of behavior and/or output. For example, in some embodiments, robotic processes executed by the input bots may be interrupted due to latency, bandwidth limitations, and/or other technical issues. In certain embodiments, such technical issues can be identified as inconsistencies. Furthermore, in various embodiments, the inconsistencies can be the basis for generating new scenarios, which scenarios can be stored, for example, in the scenario libraries 272.

The data anomaly simulator 260 repeatedly executes input bots using different samples of data, tasks or actions, some or all of which may result from the inputs generated by the scenario simulator 256. The data anomaly simulator 260 can test exception handling resulting from the different samples. For example, in some embodiments, robotic processes executed by the input bots may be interrupted due to a new popup window, for example, resulting from one of the different samples. The exceptional conditions resulting from the different samples can be tested multiple times to ensure target application behavior. In certain embodiments, such exceptional conditions resulting from different samples can be the basis for generating new scenarios, which scenarios can be stored, for example, in the scenario libraries 272.

The coding recommender 262 generates execution plans for input bots based, at least in part, on analysis performed by other modules. The execution plans can include, for example, one or more coding recommendations for the input bots. In an example, the coding recommender 262 can measure bot performance based on outputs of the scenario simulator 256, the consistency checker 258 and/or the data anomaly simulator 260. In another example, the coding recommender 262 can evaluate bot adherence to secure coding practices as evidenced, for example, in logs for specific tasks performed by the input bots. Secure coding practices can be defined according to various standards that are set forth by an appropriate organization. In some cases, the execution plan can set forth recommendations for improving or correcting the input bots. In some of these cases, the recommendations can indicate a specific coding change (e.g., a formula for translating or replacing a code section). In others of these cases, the recommendations can indicate a technical issue (e.g., an anomaly) that requires manual intervention to identify and enact a coding change. The script corrector 264, based on the execution plan by the coding recommender 262, changes the input scripts of the input bots.

The AI scoring engine 268 validates the quality and integrity of input bots. In certain embodiments, the AI scoring engine 268 can apply benchmarking logic to determine whether input bots are defective. The benchmarking logic can include, for example, a score or combination of scores based on results of executing other modules such as, for example, the scenario simulator 256, the consistency checker 258, the data anomaly simulator 260, the coding recommender 262 and/or the script corrector 264. The score can be produced on any suitable scale such as, for example, 0 to 1, where a score that fails to reach a predetermined threshold is indicative of a defective input bot. In addition, or alternatively, in some embodiments, some of the foregoing modules can produce a result indicative of either success or failure, with the AI scoring engine 268 deeming an input bot defective if it has received a result indicative of failure from any such module.

Still with reference to the AI scoring engine 268, detective input bots can be returned to users for redevelopment, for example, according to the execution plans. In various embodiments, after redevelopment, the redeveloped bots may be re-submitted to the IAS 142 for automatic simulation and testing. Non-defective bots, in contrast, can deployed in the fashion described relative to FIG. 1. Results produced by the AI scoring engine 268 and/or any other module of the IAS 142 can be stored in the results datastore 274 or in other memory.

The hypercare assistant 266 automatically identifies scenarios based on a script or business requirements document and requests the same from customer or subject matter expert (SME) through a user interface. In various embodiments, input bots execute sample tasks and share output, such as videos, via the hypercare assistant 266.

Figure 3:
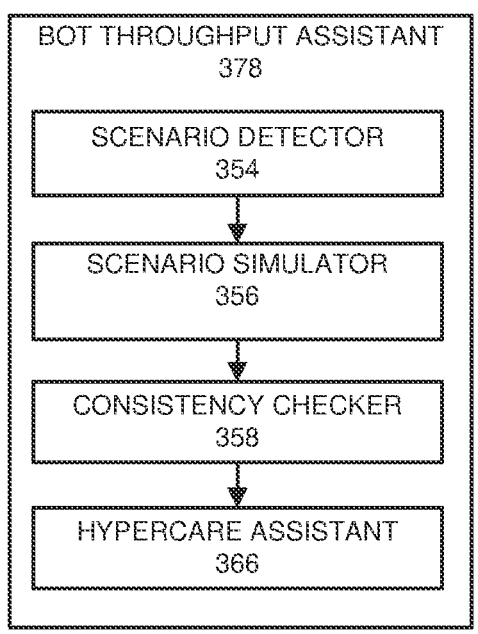
FIG. 3 illustrates an example implementation of a bot throughput assistant.

FIG. 3 illustrates an example implementation of a bot throughput assistant 378. The bot throughput assistant 378 is shown to be an organization of modules that includes a scenario detector 354, a scenario simulator 356, a consistency checker 358, and a hypercare assistant 366 that can generally operate as described relative to the scenario detector 254, the scenario simulator 256, the consistency checker 258, and the hypercare assistant 266, respectively, of FIG. 2. in the embodiment of FIG. 3, the bot throughput assistant 378 can execute at any point, including for purposes of bot optimization after deployment.

Figure 4:
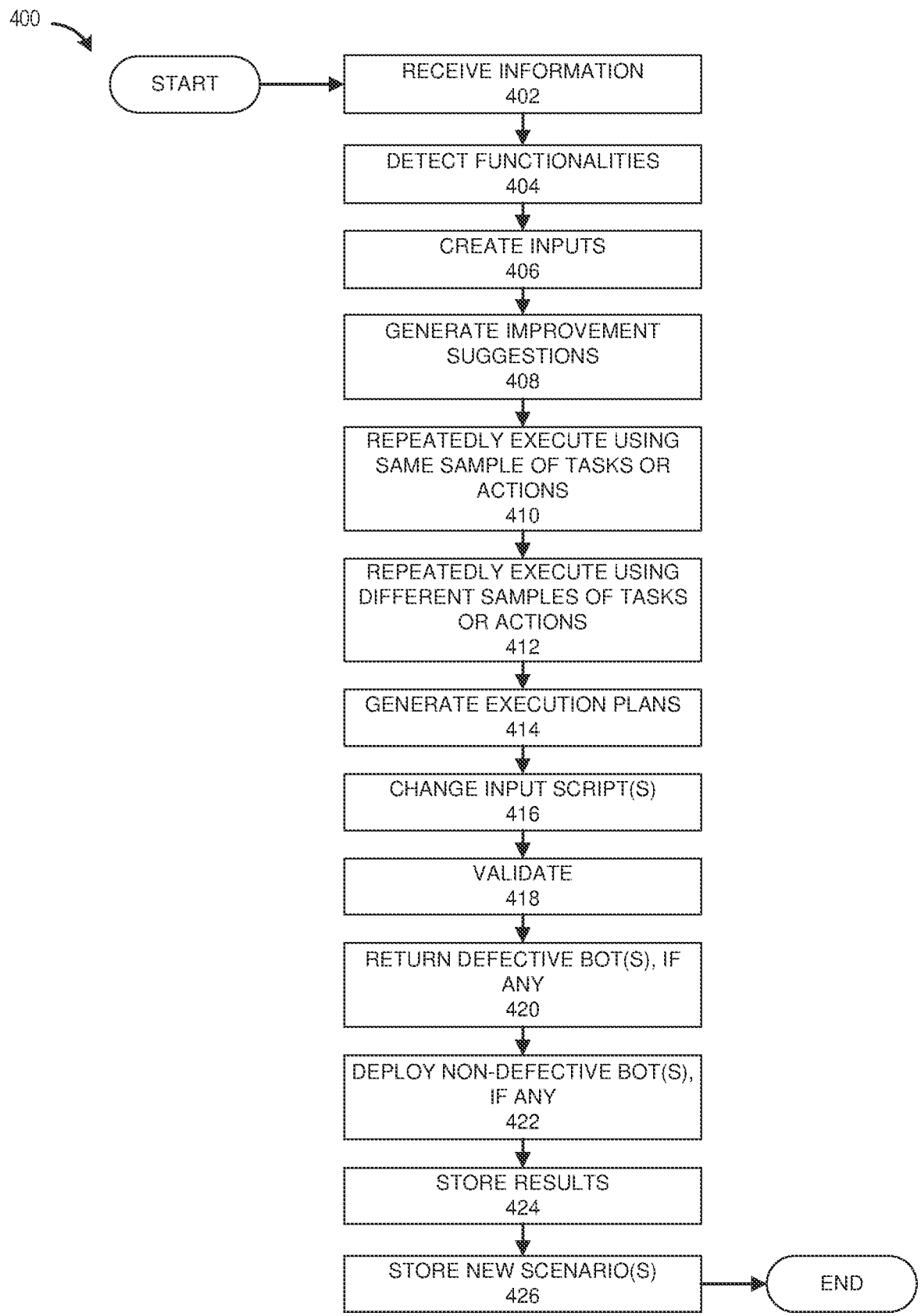
FIG. 4 illustrates an example of a process for operating an intelligent automation simulator.

FIG. 4 illustrates an example of a process 400 for operating an IAS such as the IAS 142 of FIGS. 1 and 2. In certain embodiments, the process 400 can be implemented by any system that can process data. Although any number of systems, in whole or in part, can implement the process 400, to simplify discussion, the process 400 will be described in relation to particular components shown and described relative to FIGS. 1-2.

At block 402, the scenario detector 254 receives information identifying or related to one or input bots for testing or simulation. For example, the scenario detector 254 can receive input scripts according to one or more of the RPA platforms 124 of FIG. 1. The input scripts may be all or part of, or represent all or part of, an instruction set similar to the instruction set 126 of FIG. 1.

At block 404, the scenario detector 254 detects, or identifies, one or more functionalities performed by the input bots. The functionalities can include, but are not limited to, email functionality, spreadsheet functionality (e.g., MICROSOFT EXCEL functionality), web-scraping functionality, enterprise resource planning (ERP) functionality (e.g., SAP functionality), screen-scraping functionality (e.g., CITRIX screen-scraping functionality), combinations of the foregoing and/or the like.

At block 406, the scenario simulator 256 creates a plurality of inputs for simulation of each functionality of the input bots, for example, in order to analyze their efficiency, where the inputs include tasks or actions that the input bots would perform on one or more of the RPA platforms 124. At block 408, the scenario simulator 256 generates one or more improvement suggestions for the functionality. For example, the improvement suggestions can provide for more efficient execution of the functionality and/or correction of bugs.

At block 410, the consistency checker 258 repeatedly executes the input bots using, for example, the same sample of tasks or actions, such as some or all of the inputs generated by the scenario simulator 256, to check for consistency of behavior and/or output for the sample of tasks or actions. As described previously, technical issues during execution can be identified as inconsistencies. Inconsistencies that have not been previously observed can serve as the basis for generating new scenarios for testing. Any scenarios that are generated can based on the operation of the consistency checker 258 can be maintained, for example, in the scenario libraries 272.

At block 412, the data anomaly simulator 260 repeatedly executes the input bots using different samples of data, tasks or actions, some or all of which may result from the inputs generated by the scenario simulator 256. As described previously, exceptional conditions resulting from the different samples can serve as the basis for generating new scenarios for testing, where such exceptional conditions have not been previously observed. Any scenarios that are generated can based on the operation of the data anomaly simulator 260 can be maintained, for example, in the scenario libraries 272.

At block 414, the coding recommender 262 generates execution plans for the input bots based, at least in part, on analysis performed by modules of the IAS 142. At block 416, the script corrector 264 changes the input scripts of the input bots based on the execution plans. The block 416 can be omitted if, for example, there are no automatic corrections to be made to the input scripts.

At block 418, the AI scoring engine 268 validates the quality and integrity of the input bots as described previously. In certain embodiments, the AI scoring engine 269 deems each of the input bots to be detective or non-defective. At block 420, defective bots, if any, are returned for redevelopment as described previously. Redeveloped bots may begin the process 400 anew at a later time as new input bots. At block 422, non-defective bots, if any, may be deployed. At block 424, results of executing the process 400 are stored in the results datastore 274 or in other memory. At block 426, any scenarios that have been generated during the process 400 can be stored, for example, in the scenario libraries 272. After block 426, the process 400 ends.

Figure 5:
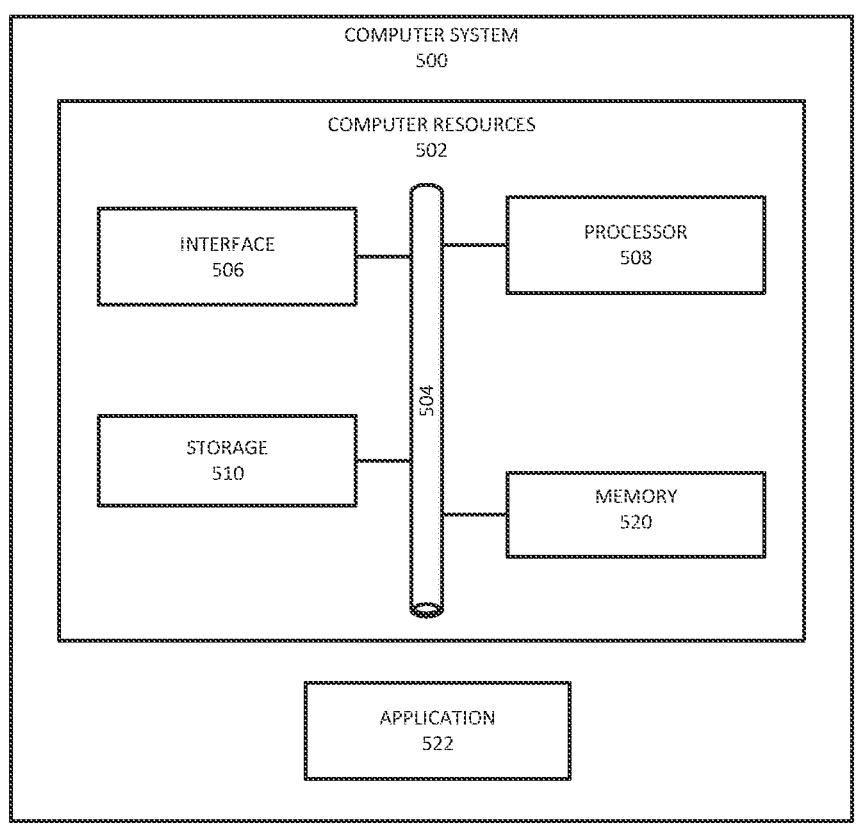
FIG. 5 illustrates an example of a computer system.

FIG. 5 illustrates an example of a computer system 500 that, in some cases, can be representative, for example, of the central management system 140, the RPA platforms 124, the tenant systems 110, the user systems 160 and/or a module or sub-component of the foregoing. The computer system 500 includes an application 522 operable to execute on computer resources 502. The application 522 can be, for example, any of the systems or modules illustrated in FIG. 1 or FIG. 2. In particular embodiments, the computer system 500 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 500 may comprise any suitable physical form, configuration, number, type and/or layout. As an example, and not by way of limitation, the computer system 500 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 500 may include one or more computer systems; be unitary or distributed; span multiple locations; span multiple machines; or reside in a cloud, which may include one or more cloud components in one or more networks.

In the depicted embodiment, the computer system 500 includes a processor 508, memory 520, storage 510, interface 506, and bus 504. Although a particular computer system is depicted having a particular number of particular components in a particular arrangement, this disclosure contemplates any suitable computer system having any suitable number of any suitable components in any suitable arrangement.

Processor 508 may be a microprocessor, controller, or any other suitable computing device, resource, or combination of hardware, software and/or encoded logic operable to execute, either alone or in conjunction with other components, (e.g., memory 520), the application 522. Such functionality may include providing various features discussed herein. In particular embodiments, processor 508 may include hardware for executing instructions, such as those making up the application 522. As an example, and not by way of limitation, to execute instructions, processor 508 may retrieve (or fetch) instructions from an internal register, an internal cache, memory 520, or storage 510; decode and execute them; and then write one or more results to an internal register, an internal cache, memory 520, or storage 510.

In particular embodiments, processor 508 may include one or more internal caches for data, instructions, or addresses. This disclosure contemplates processor 508 including any suitable number of any suitable internal caches, where appropriate. As an example, and not by way of limitation, processor 508 may include one or more instruction caches, one or more data caches, and one or more translation lookaside buffers (TLBs). Instructions in the instruction caches may be copies of instructions in memory 520 or storage 510 and the instruction caches may speed up retrieval of those instructions by processor 508. Data in the data caches may be copies of data in memory 520 or storage 510 for instructions executing at processor 508 to operate on; the results of previous instructions executed at processor 508 for access by subsequent instructions executing at processor 508, or for writing to memory 520, or storage 510; or other suitable data. The data caches may speed up read or write operations by processor 508. The TLBs may speed up virtual-address translations for processor 508. In particular embodiments, processor 508 may include one or more internal registers for data, instructions, or addresses. Depending on the embodiment, processor 508 may include any suitable number of any suitable internal registers, where appropriate. Where appropriate, processor 508 may include one or more arithmetic logic units (ALUs); be a multi-core processor; include one or more processors 508; or any other suitable processor.

Memory 520 may be any form of volatile or non-volatile memory including, without limitation, magnetic media, optical media, random access memory (RAM), read-only memory (ROM), flash memory, removable media, or any other suitable local or remote memory component or components. In particular embodiments, memory 520 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 520 may include one or more memories 520, where appropriate. Memory 520 may store any suitable data or information utilized by the computer system 500, including software embedded in a computer readable medium, and/or encoded logic incorporated in hardware or otherwise stored (e.g., firmware). In particular embodiments, memory 520 may include main memory for storing instructions for processor 508 to execute or data for processor 508 to operate on. In particular embodiments, one or more memory management units (MMUs) may reside between processor 508 and memory 520 and facilitate accesses to memory 520 requested by processor 508.

As an example, and not by way of limitation, the computer system 500 may load instructions from storage 510 or another source (such as, for example, another computer system) to memory 520. Processor 508 may then load the instructions from memory 520 to an internal register or internal cache. To execute the instructions, processor 508 may retrieve the instructions from the internal register or internal cache and decode them. During or after execution of the instructions, processor 508 may write one or more results (which may be intermediate or final results) to the internal register or internal cache. Processor 508 may then write one or more of those results to memory 520. In particular embodiments, processor 508 may execute only instructions in one or more internal registers or internal caches or in memory 520 (as opposed to storage 510 or elsewhere) and may operate only on data in one or more internal registers or internal caches or in memory 520 (as opposed to storage 510 or elsewhere).

In particular embodiments, storage 510 may include mass storage for data or instructions. As an example, and not by way of limitation, storage 510 may include a hard disk drive (HDD), a floppy disk drive, flash memory, an optical disc, a magneto-optical disc, magnetic tape, or a Universal Serial Bus (USB) drive or a combination of two or more of these. Storage 510 may include removable or non-removable (or fixed) media, where appropriate. Storage 510 may be internal or external to the computer system 500, where appropriate. In particular embodiments, storage 510 may be non-volatile, solid-state memory. In particular embodiments, storage 510 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 510 may take any suitable physical form and may comprise any suitable number or type of storage. Storage 510 may include one or more storage control units facilitating communication between processor 508 and storage 510, where appropriate.

In particular embodiments, interface 506 may include hardware, encoded software, or both providing one or more interfaces for communication (such as, for example, packet-based communication) among any networks, any network devices, and/or any other computer systems. As an example, and not by way of limitation, communication interface 506 may include a network interface controller (NIC) or network adapter for communicating with an Ethernet or other wire-based network and/or a wireless NIC (WNIC) or wireless adapter for communicating with a wireless network.

Depending on the embodiment, interface 506 may be any type of interface suitable for any type of network for which computer system 500 is used. As an example, and not by way of limitation, computer system 500 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 500 may include any suitable interface 506 for any one or more of these networks, where appropriate.

In some embodiments, interface 506 may include one or more interfaces for one or more I/O devices. One or more of these I/O devices may enable communication between a person and the computer system 500. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 506 for them. Where appropriate, interface 506 may include one or more drivers enabling processor 508 to drive one or more of these I/O devices. Interface 506 may include one or more interfaces 506, where appropriate.

Bus 504 may include any combination of hardware, software embedded in a computer readable medium, and/or encoded logic incorporated in hardware or otherwise stored (e.g., firmware) to couple components of the computer system 500 to each other. As an example, and not by way of limitation, bus 504 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 504 may include any number, type, and/or configuration of buses 504, where appropriate. In particular embodiments, one or more buses 504 (which may each include an address bus and a data bus) may couple processor 508 to memory 520. Bus 504 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 508 (such as, for example, one or more internal registers or caches), one or more portions of memory 520, one or more portions of storage 510, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of automated testing for robotic processes, the method comprising:
    receiving a robotic process automation (RPA) platform input script for an input bot for testing;
    detecting, based on the RPA platform input script for the input bot, a functionality performed by the input bot on an RPA platform;
    selecting, from a scenario library, a simulation scenario that is associated with the detected functionality performed by the input bot on the RPA platform;

creating a plurality of inputs for simulation of the detected functionality of the input bot, the plurality of inputs comprising a plurality of bot actions to be performed by the input bot, on the RPA platform, in the selected simulation scenario;

executing the input bot a plurality of times using a same sample of actions, the same sample of actions comprising the plurality of bot actions to be performed by the input bot, on the RPA platform, in the selected simulation scenario;

checking for consistency of at least one of behavior and output for the same sample of actions;

executing the input bot a plurality of times using different samples of actions, wherein at least a portion of the different samples of actions are at least partly based on the plurality of inputs;

generating an execution plan for the input bot; and automatically validating the input bot, wherein the validation results in an automated determination of whether the input bot is defective.

2. The method of claim 1, wherein the detected functionality of the input bot comprises at least one of the following:
email functionality;
spreadsheet functionality;
web-scraping functionality;
enterprise resource planning (ERP) functionality; and
screen-scraping functionality.

3. The method of claim 1, wherein the RPA platform input script is an instruction set comprising a set of computer-implemented tasks that are to be performed in sequence automatically by the input bot on the RPA platform.

4. The method of claim 1, comprising generating an improvement suggestion for the detected functionality performed by the input bot.

5. The method of claim 4, wherein the improvement suggestion comprises at least one of:
a suggestion for more efficient execution of the functionality; and
a correction of a bug.

6. The method of claim 1, the checking comprising:
identifying technical issues, during the executing of the input bot using the same sample of actions, as inconsistencies; and
generating one or more new scenarios for testing based at least partly on the inconsistencies.

7. The method of claim 6, wherein the identified technical issues relate to at least one of latency and bandwidth.

8. The method of claim 1, wherein the executing the input bot a plurality of times using the different samples of actions comprises testing exception handling.

9. The method of claim 1, comprising:
identifying exceptional conditions responsive to the executing the input bot a plurality of times using the different samples; and
generating new scenarios for testing based at least partly on the identified exceptional conditions.

10. The method of claim 1, wherein the execution plan includes a coding recommendation for the input bot.

11. The method of claim 10, comprising automatically changing the RPA platform input script for the input bot based on the coding recommendation.

12. The method of claim 1, wherein the execution plan indicates a technical issue that requires manual intervention to enact a coding change.

13. The method of claim 1, the generating the execution plan comprising measuring bot performance based on an output resulting from at least one of the same sample of actions and the different samples of actions.

14. The method of claim 1, the generating the execution plan comprising evaluating bot adherence to a secure coding practice.

15. The method of claim 1, wherein the automatically validating is based on one or more outputs of at least one of the following:
the executing the input bot a plurality of times using the same sample of actions;
the checking for consistency;
the executing the input bot a plurality of times using the different samples of actions;
the generating the execution plan for the input bot; and
an automatic correction to an input script of the input bot.

16. The method of claim 15, wherein the automatically validating comprises generating a score based on the one or more outputs, the input bot being deemed defective if the score fails to reach a predetermined threshold.

17. The method of claim 1 comprising, responsive to a determination that the input bot is defective, returning the input bot for redevelopment.

18. The method of claim 1 comprising, responsive to a determination that the input bot is non-defective, automatically deploying the input bot on the RPA platform.

19. A computer system comprising a processor and memory, wherein the processor and the memory in combination are operable to implement a method comprising:
receiving a robotic process automation (RPA) platform input script for an input bot for testing;
detecting, based on the RPA platform input script for the input bot, a functionality performed by the input bot on an RPA platform;
selecting, from a scenario library, a simulation scenario that is associated with the detected functionality performed by the input bot on the RPA platform;
creating a plurality of inputs for simulation of the detected functionality of the input bot, the plurality of inputs comprising a plurality of bot actions to be performed by the input bot, on the RPA platform, in the selected simulation scenario;
executing the input bot a plurality of times using a same sample of actions, the same sample of actions comprising the plurality of bot actions to be performed by the input bot, on the RPA platform, in the selected simulation scenario;
checking for consistency of at least one of behavior and output for the same sample of actions;
executing the input bot a plurality of times using different samples of actions, wherein at least a portion of the different samples of actions are at least partly based on the plurality of inputs;
generating an execution plan for the input bot; and
automatically validating the input bot, wherein the validation results in an automated determination of whether the input bot is defective.

20. A computer-program product comprising a non-transitory computer-usable medium having computer-readable program code embodied therein, the computer-readable program code adapted to be executed to implement a method comprising:
receiving a robotic process automation (RPA) platform input script for an input bot for testing;
detecting, based on the RPA platform input script for the input bot, a functionality performed by the input bot on an RPA platform;

selecting, from a scenario library, a simulation scenario that is associated with the detected functionality performed by the input bot on the RPA platform;
creating a plurality of inputs for simulation of the detected functionality of the input bot, the plurality of inputs comprising a plurality of bot actions to be performed by the input bot, on the RPA platform, in the selected simulation scenario;
executing the input bot a plurality of times using a same sample of actions, the same sample of actions comprising the plurality of bot actions to be performed by the input bot, on the RPA platform, in the selected simulation scenario;
checking for consistency of at least one of behavior and output for the same sample of actions;
executing the input bot a plurality of times using different samples of actions, wherein at least a portion of the different samples of actions are at least partly based on the plurality of inputs;
generating an execution plan for the input bot; and
automatically validating the input bot, wherein the validation results in an automated determination of whether the input bot is defective.

\* \* \* \* \*